Nov. 6, 1928. Re. 17,128

C. L. DAUN ET AL

REMOVABLE STATOR FOR ELECTRIC MOTORS

Original Filed Jan. 29, 1923

INVENTORS:
Carl L. Daun,
and Paul E. Keller.
BY Ralph W. Brown,
ATTORNEY.

Reissued Nov. 6, 1928. Re. 17,128

UNITED STATES PATENT OFFICE.

CARL L. DAUN AND PAUL E. KELLER, OF MILWAUKEE, WISCONSIN, ASSIGNORS, BY MESNE ASSIGNMENTS, TO SPLITDORF ELECTRIC COMPANY OF WISCONSIN, OF MILWAUKEE, WISCONSIN, A CORPORATION OF WISCONSIN.

REMOVABLE STATOR FOR ELECTRIC MOTORS.

Original No. 1,626,028, dated April 26, 1927, Serial No. 615,685, filed January 29, 1923. Application for reissue filed September 17, 1927. Serial No. 220,200

Our invention relates to removable stators for electric motors and has for an object the provision of a stator support capable of accurately centering and firmly anchoring the same centrally of the frame and readily releasable to free the stator from the frame and thus permit the same to be easily withdrawn axially from within the frame. This we accomplish by the use of a series of spacer elements or keys which are driven into firm contact with and between the stator and frame and coact therewith to accurately center and firmly anchor the stator and which are removable to thereby provide ample clearance to permit free withdrawal of the stator.

For this and other purposes which will hereinafter appear the motor frame shown and hereinafter specifically described is provided interiorly with a plurality of projections, the latter being spaced about the frame, and also at one end with inwardly projecting lugs which receive bolts passing through the stator to position and retain the latter properly in the frame. The said projections are preferably grooved on their opposite faces for the reception of removable keys by means of which the stator is maintained in concentric relation to the axis of the shaft of the motor. Caps are applied to the ends of the frame to form journals for the motor shaft and complete the structure.

Having thus outlined the general nature of our invention, we will now proceed to a specific description of the same, and will point out the novelty thereof in the appended claims.

Referring to the accompanying drawing.

Figure 1:
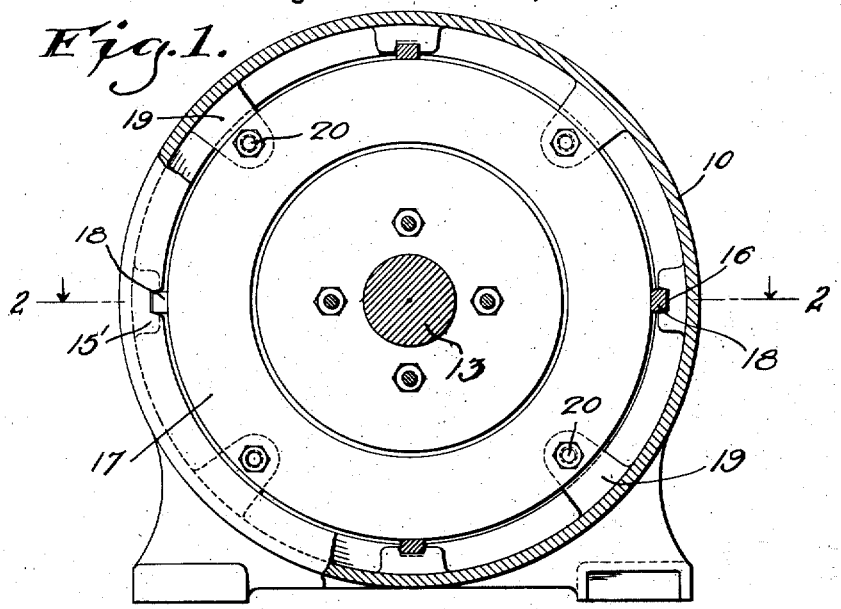
Figure 1 is a view in elevation, with parts in section, of our improved motor.
Figure 2:
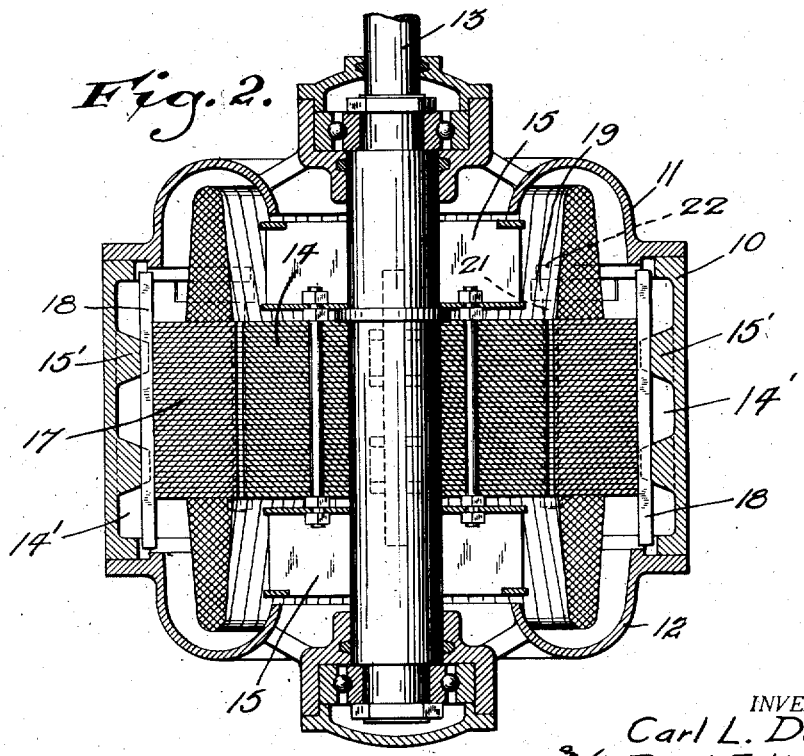
Fig. 2 is a horizontal section on the line 2—2, Fig. 1, looking in the direction of the arrows, showing the construction, and arrangement of the parts embodied in our improvement.

In the drawing, the numeral 10 indicates the frame of our motor, the said frame being open from end to end. Caps 11 and 12, of any suitable construction may be secured to the ends of the frame so as to complete the structure. The shaft 13 of the rotor 14 is journaled in bearings formed in the said caps. Fans 15, supported on the shaft 13, one at each end of the rotor, are arranged for effecting a forced circulation of air through the motor and prevent overheating.

The motor frame is provided interiorly with a circumferential channel 14′, through which the air is circulated by the fans while the motor is in operation. At a plurality of points upon the inside of the motor frame, projections 15′ are arranged circumferentially of the frame and also axially with respect to the center line thereof. These projections 15′ are machined so as to produce preferably grooves 16 which latter are formed on lines parallel with each other and aligned axially with the rotor so that the bottom of such grooves will stand substantially concentric with the axis of the rotor, when the parts of the motor are assembled.

The outer diameter of the laminated stator ring 17 is slightly less than the shortest distance between opposite projections 15′, so that the stator may be easily slipped into its position in the motor frame. The laminations of the stator core or ring 17 are clamped together by means of clamping bolts 20 and nuts 21 coacting with the threaded bolt ends and with the core end. Keys 18 are driven into the grooves 16 of the projections, and engage the stator ring at several points upon its circumference, so that the stator ring is accurately centered with respect to the rotor. The side walls of the grooves 16 constitute means for confining the keys 18 against lateral displacement, and the keys 18 may have a slight wedging action, but this provision is not regarded as essential to successful installation.

The interior of the motor frame is provided with a series of inwardly projecting lugs 19 having holes adapted to receive the projecting threaded ends of the clamping bolts 20. After the stator core or ring 17 has been positioned within the frame 10, nuts 22 may be applied to the threaded bolt ends to lock the stator core and its winding within the frame and to prevent rotation thereof.

In removing the stator, in case necessity therefor arises, it is necessary only to drive out the keys 18 and loosen the end nuts 22 of the bolts 20 which hold the stator against the lugs 19, after removing the end caps and withdrawing the rotor. A wrench, a drift and a hammer are the only tools required in performing this operation. Removal of a part only of the keys will sufficiently relieve the stator of its binding pressure, and permit its removal with its winding as a unit from the frame. As hereinbefore stated, the time required for replacement of the stator winding is very small, and consequently it is not necessary to ship the motor for rewinding in the event that the latter becomes unserviceable. In a plant using several motors of uniform construction, reserve stators may be kept in stock, but in the absence of a reserve stator, a new one can be obtained and replacement effected in much less time than the old one can be re-wound.

Having thus described our invention, what we claim and desire to secure by Letters Patent of the United States is:

1. In an electric motor, a frame, a stator and a rotor, mounted therein, the said frame being provided interiorly with a plurality of circumferential rows of grooved projections concentrically and axially aligned with respect to the rotor, and locking keys, each engaging a plurality of the aligned grooved projections and the stator, to position the latter concentrically with relation to the rotor, whereby upon removal of the said keys the stator and its winding as a unit may be withdrawn from the frame.

2. In an elecrtic motor, a frame having a series of inwardly extending projections and an intervening series of inwardly extending lugs, a laminated stator core disposed within said frame and having its periphery spaced from said projections, said core being provided with laminæ clamping means attachable to said lugs to prevent endwise displacement of said core, and a core positioning key spanning the space between each of said projections and the periphery of said core to maintain said core centrally within said frame.

3. In an electric motor, a frame having a series of inwardly extending projections and an intervening series of inwardly extending lugs, a laminated stator core disposed within said frame and having its periphery spaced from said projections, said core being provided with laminæ clamping means attachable to said lugs to prevent endwise displacement of said core, a plurality of parallel core positioning keys spanning the spaces between said projections and the periphery of said core to maintain said core centrally within said frame, and means coacting with the sides of said keys to maintain said keys parallel to each other and to the stator axis.

4. In an electric motor the combination of a frame member, a stator member, one of said members having a circular series of projections extending toward but peripherally spaced from said other member, and spacer keys removably interposed between said projections and said other member coacting with each other and said projections to accurately center and positively anchor said stator member within the frame, whereby upon removal of said keys said stator member is freely withdrawable from the frame.

5. In an electric motor the combination of a frame member, a stator member, one of said members having a circular series of projections extending toward but peripherally spaced from said other member, spacer keys driven lengthwise into binding contact between said projections and said other member to accurately center and positively anchor said stator member within the frame, and interlocking means between said keys and projections for holding said keys against lateral displacement but permitting lengthwise removal of said keys to render said stator member freely withdrawable from the frame.

6. In an electric motor the combination of a frame member, a stator member, one of said members having a plurality of axially spaced circular series of projections extending toward said other member and providing a substantially unobstructed air passage between said members, and keys removably interposed between said projections and said other member and coacting with each other and said projections to accurately center and positively anchor said stator member within the frame.

7. In an electric motor the combination of a frame structure, a stator structure, a rotor therein, one of said structures being provided with a plurality of circumferential rows of grooved projections concentrically and axially aligned with respect to said rotor, and locking keys each engaging a plurality of the aligned grooved projections and the other of said structures to position said stator structure concentrically with relation to said rotor, whereby upon removal of the said keys the stator structure may be withdrawn as a unit from said frame structure.

8. In an electric motor the combination of a stator core, a frame housing said core and peripherally spaced therefrom to provide a circumferential air passage thereabout, a series of projections extending inwardly from said frame toward the periphery of said core, and elements removably interposed in binding contact with and between said core and projections to provide a positive centering means for said core releasable to permit free removal of said core as a unit, said projections and elements being shaped and arranged to avoid interrupting the continuity of said circumferential passage.

In witness whereof, we hereunto subscribe our names this 1st day of September, 1927.

CARL L. DAUN.
PAUL E. KELLER.